United States Patent [19]

Johnen et al.

[11] Patent Number: 4,696,657
[45] Date of Patent: Sep. 29, 1987

[54] ELASTIC SHAFT COUPLING FOR TRANSMISSION OF TORQUE BETWEEN SHAFTS

[75] Inventors: Rolf Johnen, Bergisch-Gladbach; Hans Kirch, Burscheid; Volkmar Otto, Leverkusen, all of Fed. Rep. of Germany

[73] Assignee: Goetze AG, Burscheid, Fed. Rep. of Germany

[21] Appl. No.: 763,970

[22] Filed: Aug. 8, 1985

[30] Foreign Application Priority Data

Aug. 10, 1984 [DE] Fed. Rep. of Germany ....... 3429519

[51] Int. Cl.⁴ .............................................. F16D 3/68
[52] U.S. Cl. .................................................. 464/93
[58] Field of Search ...................... 464/87, 92, 93, 137

[56] References Cited

U.S. PATENT DOCUMENTS

| 1,261,683 | 4/1918 | Behn ................................. 464/92 X |
| 2,982,118 | 5/1961 | Franceschetti et al. ............... 464/93 |
| 3,112,626 | 12/1963 | Barone ................................ 464/71 |
| 3,238,742 | 3/1966 | Martorana ........................... 464/93 |
| 3,385,082 | 5/1968 | Deuring et al. ...................... 464/83 |
| 3,470,710 | 10/1969 | Feller et al. ......................... 464/93 |
| 3,478,539 | 11/1969 | Daur .................................. 464/93 X |
| 3,683,643 | 8/1972 | Kirschey ............................ 464/93 |
| 3,901,047 | 8/1975 | Pletsch et al. ...................... 464/93 |

FOREIGN PATENT DOCUMENTS

| 854293 | 11/1952 | Fed. Rep. of Germany . |
| 2615923 | 4/1977 | Fed. Rep. of Germany . |
| 7932960 | 3/1981 | Fed. Rep. of Germany . |
| 1532896 | 7/1968 | France . |

Primary Examiner—Daniel P. Stodola
Attorney, Agent, or Firm—Spencer & Frank

[57] ABSTRACT

An elastic shaft coupling for transmission of torque between two shafts. The coupling includes a polygonal rubber ring and a hub spider having a plurality of radially extending arms vulcanized in the rubber ring and being adapted for connection to the end of one shaft. Fastening elements are disposed between the arms of the hub spider and are vulcanized into the rubber ring. Each fastening element is also adapted for connection to the end of the other shaft. A centering device is provided in the region of the inner circumference of the hub spider for centering the shaft coupling relative to the one shaft.

3 Claims, 2 Drawing Figures

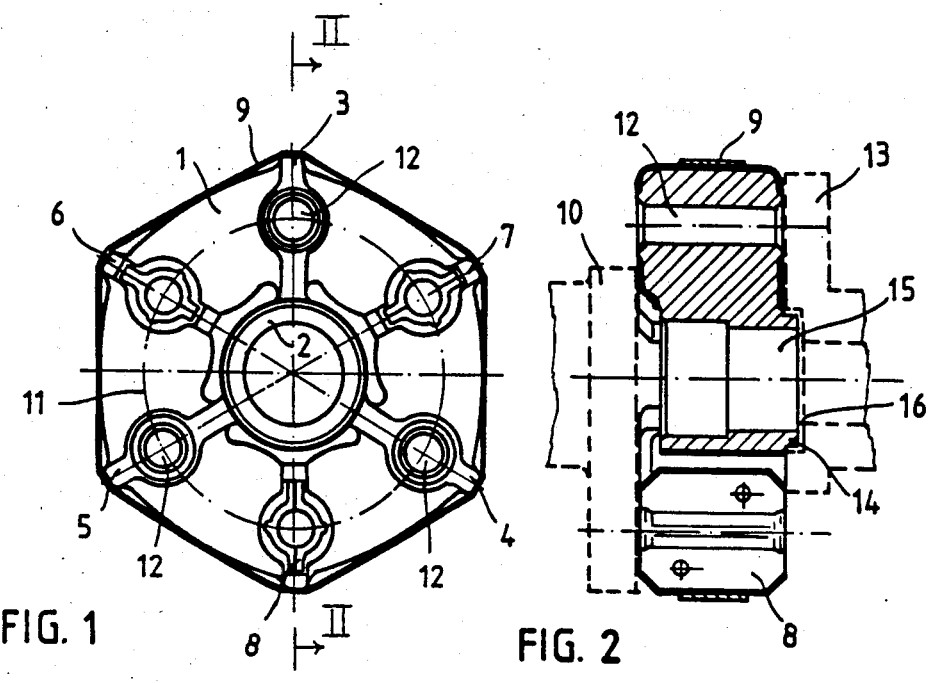

4,696,657

ELASTIC SHAFT COUPLING FOR TRANSMISSION OF TORQUE BETWEEN SHAFTS

BACKGROUND OF THE INVENTION

The present invention relates to an elastic shaft coupling for connecting the end regions of two machine parts, particularly for connecting a motor vehicle drive shaft to an articulated shaft, comprising a customarily polygonal rubber ring into which is vulcanized a hub spider having a plurality of arms with connecting or fastening elements disposed therebetween.

An elastic shaft coupling of the above type, which thus serves to connect two shaft ends, is disclosed in German Utility Model Pat. No. 79/32,960. The shaft coupling according to that patent is composed of a polygonal rubber ring having clamping sleeves vulcanized to its ends for the alternating attachment of the shaft ends, with every other clamping sleeve being formed by an arm of a hub spider. The hub spider is provided with a central bore for the exchangeable accommodation of centering sleeve for centering the shaft journal of a drive shaft.

German Auslegeschrift [German Published Patent Application No. 2,615,923 discloses another elastic shaft coupling of the foregoing type wherein metal members, which comprise the arms of individual sector members of a shaft spider, are disposed between the arms of a hub spider. The individual sector members are moved radially inwardly toward one another by means of a device which simultaneously pretensions the rubber columns, after which the individual sector members are permanently connected together by welding, gluing or the like so as to form a complete shaft spider.

Customarily, the above-mentioned shaft couplings are provided, at the side of their hub spider, with a sliding member having the profile of an involute spline shaft. Although this measure permits a plug-in connection to be established between the coupling and the end of one shaft, such a plug-in connection requires a relatively large amount of space in the axial direction. Moreover, it is not possible to simultaneously balance the coupling and the one shaft end.

SUMMARY OF THE INVENTION

It is therefore an object of the present invention to reduce the structural size and weight of an elastic shaft coupling of the foregoing type and to enable a shaft coupling of this type to be balanced together with one shaft end.

The above and other objects are achieved according to the invention by the provision of a method for balancing a first shaft which is to be connected by an elastic shaft coupling to a second shaft, which is not to be balanced, wherein the coupling includes a polygonal rubber ring, a hub spider having a plurality of arms vulcanized into the rubber ring, and fastening elements disposed between the arms. The method includes: connecting the fastening elements, which are not centered in the circumferential direction, with the first shaft; balancing the first shaft together with the coupling; and connecting the coupling to the second shaft after the balancing step.

Therefore, according to the invention, the fastening elements, which are uncentered in the circumferential direction, are connected with the end of a machine part that is to be balanced together with the shaft coupling. The hub spider, or more specifically its arms, are connectable with the end of the other machine part. The shaft coupling, which is customarily provided with a restraining strap in a well known manner, is initially connected with the one shaft end by means of its fastening elements, which in the untensioned state are not disposed on the pitch diameter and which are disposed between the arms of the hub spider. The thus connected parts are balanced (which heretofore had been impossible due to the non-rotatable plug-in connection of the other shaft and with the hub spider), so that no change in the balanced state occurs when the coupling is attached to the other shaft end. In the past, both parts, namely the shaft coupling and the machine part to be balanced, were balanced separately and then connected together. Due to manufacturing tolerances it often happened that the service life of the elastic shaft coupling was reduced considerably. If both parts are balanced together, the fixed hub spider via its arms which are also provided with fastening elements, can be connected with the other shaft end without such problems.

In order to prevent the occurrence of such problems during operation, a centering device is provided in the region of the hub spider, with such centering device cooperating with the second machine part which does not require balancing. The centering device may be provided in the form of at least one preferably circumferential axial projection in the region of the hub spider bore, with this projection engaging in a corresponding recess in the second machine part.

Preferably, the metal parts and/or the hub spider are made of a light metal, such as, for example, aluminum or an aluminum alloy, so as to further reduce the total weight of the shaft coupling.

The invention is illustrated in the drawings and will be described in greater detail below.

BRIEF DESCRIPTION OF THE DRAWINGS

FIG. 1 is an axial view of an elastic shaft coupling according to a preferred embodiment of the invention.

FIG. 2 is a sectional view of FIG. 1 along line II—II.

DESCRIPTION OF THE PREFERRED EMBODIMENT

FIGS. 1 and 2 show an elastic shaft coupling composed of the following parts: a polygonal rubber ring 1, a three-armed hub spider 2 having arms 3 through 5 vulcanized into the rubber ring, two-part sleeve-shaped fastening elements 6 through 8 disposed between arms 3 through 5 and which may likewise be vulcanized into the rubber ring, and a restraining strap 9 for pre-tensioning the rubber ring.

In order to balance the coupling together with, for example, an articulated shaft 10 (shown in FIG. 2 in dashed lines), sleeves 6 through 8 (which in the untensioned state of the coupling, do not lie on a pitch diameter) are initially connected with shaft end 10 by conventional nuts and bolts (not shown). In this state, both parts are balanced together after restraining strap 9 has been removed.

Passage holes 12 in arms 3 through 5 of hub spider 2 lie in a defined pitch diameter which is the same as, in this case, the circle 11 shown in FIG. 1 by a dash-dot line, and no longer change the balanced state after being attached to drive shaft end 13 (likewise shown in FIG. 2 in dashed lines), again by nuts and bolts (not shown).

To center the end of the coupling at the side of the hub spider with respect to shaft end 13, the region of hub spider bore 15 is provided with an axially extending, cylindrical projection 14 which engages in a corresponding groove 16 of drive shaft end 13.

In order to be able to balance a machine element together with the shaft coupling, the fastening elements 6 to 8 of the shaft coupling which, in the untensioned state of the coupling, do not lie on a pitch diameter, are connected with shaft 10. The shaft 10 is then balanced together with the shaft coupling. The arms 3 to 5 of the hub spider which all lie on a defined pitch diameter, are thereafter connected with the other shaft 13 without changing the balanced state once it has been attained.

It will be understood that the above description of the present invention is susceptible to various modifications, changes and adaptations, and the same are intended to be comprehended within the meaning and range of equivalents of the appended claims.

What is claimed is:

1. An elastic shaft coupling for the transmission of torque between a drive shaft and a driven shaft, comprising:

a polygonal rubber ring;

a hub spider having an inner circumference and a plurality of radially extending arms vulcanized in said rubber ring, each said arm having first connecting means for connecting said ring to the drive shaft for transmission of torque therebetween, said first connecting means comprising a bore for receiving a fastening member for connecting a respective one of said arms to the drive shaft;

fastening elements disposed between said arms and vulcanized into said rubber ring, each said fastening element having second connecting means for connecting said ring to the driven shaft for transmission of torque therebetween; and centering means, comprising a projection extending axially from said hub spider provided in the region of the inner circumference of said hub spider for engaging a corresponding recess in the drive shaft, for centering said shaft comprising substantially without radial play relative to the drive shaft.

2. The coupling of claim 1, wherein said projection has the shape of a cylinder.

3. The coupling of claim 1 wherein each of said fastening elements is provided with a bore constituting said second connecting means for accommodating a fastening member for connecting a respective one of said fastening elements to thee driven shaft.

* * * * *